United States Patent [19]

Brugarolas et al.

[11] Patent Number: 5,442,005
[45] Date of Patent: Aug. 15, 1995

[54] MULTI-FUNCTION PROTECTIVE COATING FOR ZINC COATED STEEL SURFACES AND ITS ALLOYS

[75] Inventors: Juan F. Brugarolas; Federico S. Rodellas, both of Barcelona, Spain

[73] Assignee: Procoat S.A., Rubi (Barcelona), Spain

[21] Appl. No.: 9,373

[22] Filed: Jan. 26, 1993

Related U.S. Application Data

[63] Continuation of Ser. No. 770,159, Oct. 3, 1991, abandoned, which is a continuation of Ser. No. 492,362, Mar. 9, 1990, abandoned, which is a continuation of Ser. No. 198,511, May 25, 1988, abandoned.

[30] Foreign Application Priority Data

Nov. 26, 1987 [EP] European Pat. Off. ........... 87500083

[51] Int. Cl.$^6$ .................................................. C08K 3/20
[52] U.S. Cl. ................................. 524/276; 524/475; 524/406; 524/487; 524/558
[58] Field of Search ............... 524/475, 487, 406, 276, 524/556

[56] References Cited

U.S. PATENT DOCUMENTS

| | | | |
|---|---|---|---|
| 4,151,138 | 4/1979 | Citrone et al. | 524/475 |
| 4,289,671 | 9/1981 | Hernandez | 260/28.5 AV |
| 4,317,755 | 3/1982 | Gregory | 524/487 |
| 4,439,495 | 3/1984 | Tobias | 428/463 |
| 4,485,131 | 11/1984 | Adams et al. | 524/556 |
| 4,576,987 | 3/1986 | Crockatt et al. | 524/487 |
| 4,719,038 | 1/1988 | Sobata et al. | 524/401 |
| 4,752,634 | 6/1988 | Goss | 524/487 |
| 4,942,193 | 7/1990 | Van Buskirk et al. | 524/276 |

FOREIGN PATENT DOCUMENTS

| | | | |
|---|---|---|---|
| 2208255 | 9/1972 | Germany | 524/487 |
| 598921 | 3/1978 | Russian Federation | 524/487 |

*Primary Examiner*—Paul R. Michl
*Assistant Examiner*—Edward Cain
*Attorney, Agent, or Firm*—Jacobson, Price, Holman & Stern

[57] ABSTRACT

This invention provides a coating for zinc coated steel surfaces and other zinc containing alloys, including zinc/iron, zinc/nickel, zinc/cobalt, zinc/aluminum, and any other suitable metal surface. The coating product of this inventions contains the following ingredients: copolymers made from acrylic, vinylacrylic, and acrylstyrene monomers, has carboxylic radicals from acrylic and/or methacrylic acids, and has an Ia of 30 to 60 mg. of KOH. The water soluble copolymers and lubricatory additives, which include natural or synthetic waxes, graphite, and molybdenum sulfide, are in solid form dispersed in aqueous solution at a ratio of from 1 to 10%.

27 Claims, No Drawings

MULTI-FUNCTION PROTECTIVE COATING FOR ZINC COATED STEEL SURFACES AND ITS ALLOYS

This is a continuation of application Ser. No. 07/770,159, filed Oct. 3, 1991 which was abandoned upon the filing hereof; which in turn was a continuation of application Ser. No. 07/492,362 filed Mar. 9, 1990, abandoned, which was a continuation of application Ser. No. 07/198,511 filed May 25, 1988, abandoned.

TECHNICAL FIELD OF THE INVENTION

The present invention, "MULTI-FUNCTIONAL PROTECTIVE COATING FOR ZINC COATED STEEL SURFACES AND FOR OTHER ALLOYS" relates to a temporary protective coating for steel or alloys thereof that are coated with zinc. The protective coating of this invention which, when applied under the conditions and using the composition described herein, will perform as a multifunctional protective coating that has characteristics which are specified herein.

BACKGROUND OF INVENTION

Because of the demand for corrosion resistanct metal alloys, zinc coated steel materials find an increasing use in industry, especially in the automotive field. Steel surfaces are normally coated with zinc metal either by electrolytic means, such as zinc electrocoated steel (EC), or by a dipping process in molten zinc as, for example, hot dip galvanized steel (HDG).

More recently, other coatings that contain more than one metal have been produced. We refer to coatings containing zinc/nickel and zinc/iron, which are obtained by electrodeposition, and to other coatings that have zinc/aluminum that are produced by a molten metal dip process. A zinc/iron alloy can be obtained on the surface of HDG by heat treatment (annealing).

The use of such materials in industry presents more serious problems in metal forming operations, more precisely deep drawing and stamping, than cold rolled steel sheet. This fact may be attributed to the different degree of smoothness on the metal surface.

The use of special oils for metal working, especially stamping, does not solve the problem entirely. Sometimes it can be very difficult to remove such oils after metal forming and prior to painting. Because of the heavy coating normally used (2–4 gr./m$^2$) when wax type lubricants are used for this purpose, they are similarly difficult to remove, It is well-known that zinc coated steel has as a surface which is normally rougher or has more porosity than CRS. This fact makes oil cleaning a difficult operation. Consequently, degreasing processes become more complex.

One typical characteristic of zinc electrocoated steel is the ease with which zinc dust is loosened during sheet forming operations. This is particularly observed near the edges of the sheets where a thicker zinc coating, which consequently is less adherent, is formed. This leads to early wearing out or dusting of stamping presses or other tools.

In order to avoid premature oxidation of metal sheets during long periods of storage and transport, it is a common practice to protect zinc materials with rust inhibitor oils. The composition of antioxidant oils may be altered during long periods of exposure to light and ambient conditions. Sometimes the oils become physically occluded inside the porous surface of the metal.

SUMMARY OF THE INVENTION

The aim of the present invention is to produce a multi-function organic coating for zinc coated steel materials.

DESCRIPTION OF THE PREFERRED EMBODIMENTS

The organic coatings of this invention provide the following beneficial properties:

(1) they provide a lubricatory effect whereby the coefficient of friction of the metal is reduced and metal forming conditions are improved;

(2) they result in metals having a higher degree of cleanliness on their surfaces by improving the ability of cleaners to work by decreasing both the temperature at which they work and the .degreasing time necessary for them to work;

(3) they prevent zinc dust loosening during metal forming jobs; and (4) they provide protection against corrosion during storage and transport of metal sheets coated therewith, but they do not chemically alter the metal surface.

The above-listed properties of the protective coating described in this invention are achieved by applying a dry film of at least 0.5 gr./m$^2$ onto the metal surface.

The protective coatings of this invention contain the following ingredients.

(1) Organic copolymers containing monomers of acrylic, vinyl-acrylic, styreneacrylic, and nitrilacrylic, which have free carboxylic groups;

(2) lubricatory additives, which may provide a low friction coefficient to the deposited film. A selection was made from amongst those additives that do not alter the "dry state" of the film. The additives selected include inorganic compounds, such as graphite, molybdenum sulfide, calcium carbonate, and/or organic products, such as natural and synthetic waxes. Amongst these, montana, carnauba, polyethylene and other waxes, such as the hydroxystearic acid soaps of calcium, zinc or lithium fatty amides, with or without ethylene oxide groups, and polymers, such as nylon and teflon;

(3) polyvalent cations, which crosslink the copolymer, are added in order to increase the corrosion resistance of the film; and (4) conductive particles, such as carbon black, magnetite, and powdered metals, are added to the coatings of this invention in order to increase film conductivity and thereby improve the welding properties of the coated metals.

The organic copolymers used in the present invention are prepared by a solution polymerization process and they contain monomers, such as ethyl, butyl, ethyl-2-hexyl acrylates, vinyl esters, styrene, methyl-acrylate, and acrylic and methacrylic acid.

Carboxylic acid groups are added to the polymeric resin to provide an Acidity index, Ia=30–60 mg. KOH. This Ia provides solubility in water once the polymer is brought to pH 8 or above. The resin is normally prepared at a 50–60% dry solids content in solvents selected from the group of alcohols and glycols.

The preferred waxes for use in the present composition are those which have previously been made water dispersable. Consequently, they are miscible with the water-soluble resin. This results in a final product that has a high water content and, thus, a lower risk of fire. Typical waxes that can be used in the compositions of this invention are those known in the market under the trade names Vestowax (Chemische Werke Hülls, AG), Epolene (Eastman Kodak) and others from BASF.

When solid mineral type lubricants are used in the present invention, they are introduced into the mix by first dispersing them into water. Tixothropic thickeners, such as colloidal silica compounds, bentonites, and diurethanes, are used to prevent the lubricants from rapidly settling.

The above two main ingredients provide a product with the properties of the compositions of the present invention. These properties include a reduced coefficient of friction, easy removal of the films with alkaline cleaners, prevention of zinc dusting, and corrosion protection during storage and transport of the zinc coated metal surface.

If a higher degree of corrosion resistance is desired, the addition of polyvalent cations, such as Zn, Cr, etc. in the form of soluble complexes has proven to be highly effective.

If a coating according to the present invention is applied onto a metal sheet to a thickness of greater than 2 gr./m$^2$, it is necessary to add conductive elements to the composition so that the coated sheet remains weldable. Conductive particles, as described above, can be added to the composition in a proportion equivalent to between 2 and 5% with respect to the dry solids content of the composition. When this is done, the appearance of the final coating is darker. 0.5 to 5 gr./m$^2$ of the dry film weight is deposited on the zinc coated metal. The amount of water added to dilute the compositions of this invention varies as a function of the process by which said composition is deposited on the zinc coated metal. The processes include, but are not limited to, immersion or flooding followed by roll squeezing and roll coating or electrostatic spraying onto the metal strip.

Zinc coated steel strips that have been coated with a film, having a weight of no less than 0.5 gr./m$^2$ of the coating of this invention, can then be treated with protective oils or with special stamping oils in order to improve the performance of the film.

The degree of corrosion resistance obtained using the coatings of this invention, which is measured in a Humidity Cabinet, at 40° C. and 100% relative humidity (DIN 50017) is:

| | |
|---|---|
| Product prepared according to Example no. 1 (1–1.5 gr./m | 24 H |
| Product prepared according to Example no. 2 (1–1.5 gr./m$^2$ | 100 H |
| Product prepared according to Example no. 2 (0.5 gr./m$^2$) + Protective oil (0.5 gr./m$^2$) | 400 H |
| Protective oil (1 gr./m$^2$) | 24–48 H |

It was discovered that when oils are applied to metal sheets that have already been coated with the products of this invention, it is easier to remove them from the metal surfaces with ordinary alkaline cleaners than when oils are applied to bare zinc coated metal sheets.

The following table illustrates the reduction in time and temperature in a cleaning operation using a standard alkaline degreaser at pH=9.5.

| | Degreasing bath temp. | Time required |
|---|---|---|
| Product according to the invention | 80–85° C. | <1 min. |
| Stamping oil | 80–85° C. | 5 min. |
| Product + Stamping Oil | 80–85° C. | 2 min. |
| Stamping oil | 55–60° C. | 6 min. |
| Product + Stamping Oil | 55–60° C. | 2–3 min. |

The ease with which oils can be removed after 6 months of aging has also been tested.

It was discovered, as demonstrated by the data presented in the above table, that coating a metal sheet that has a film of the product of this invention with oil, does not keep the resin from dissolving. This property is a great help when removing old oil coatings that have started to resinify by virtue of a chemical alteration in their compositions from light exposure.

It is well known that zinc coated metal sheets are difficult to mold and deform because of the different degrees of smoothness of the surface or because of its zinc dusting on the surfaces.

References to this point may be found in:

"Friction & Wear" I. V. Kragelskii, Butterworths, London 1965, 117–121.

"Friction & Wear of Materials" E. Rabinowicz Wiley, N.Y. 1965, 125–142.

"Sheet Metal Industry" Lillewodd & Wallace, Vol. 41, 1964 p. 925.

"Sheet Metal Industry" Butter and Pope, Vol. 44, p. 579.

"Relationship between Surface Characteristics and Galling Index of Steel Sheet" R. R. Hilsen and L. M. Bermick.

According to the above-mentioned Sliding Friction Test, the friction ratio between static pressure and dynamic pressure is also referred to as a Galling Index. Any value of the friction ratio below 1.2 is defined in this method as a non-galling material. Zinc coated steel treated with the product of this invention was tested on different substrates and found to have a friction ratio below 1.2.

The organic coatings of this invention provide lubricatory properties that minimize or make it unnecessary to use special oils for metal forming jobs, when metal sheets are coated therewith. Because of the continuity and adherence of the film to the metal base, machine tools are prevented from gripping. The continuity and adherence of the coatings of this invention result from the reactivity of the carboxylic groups in the coatings to the metal and from the solid nature of the coatings that prevents them from being squeezed off the metal from the pressure of the tool.

The advantages to a zinc coated steel surface that derive from lubricatory properties of the coatings of the present invention are also observed when said coatings are applied to other materials, such as stainless steel, that are difficult to deform and mold.

Although the product of this invention was originally designed for use on zinc coated steel strips when applied by a continuous process, it can be applied for the protection of components and pieces made from the above-mentioned materials, which are coated by dipping or spraying followed by hot air drying or by equivalent means.

The use of acrylic resins that contain free carboxylic groups has been used to provide temporary protective coatings (see,e.g., "Galvano-Organo - Traitements de Surfaces" no 568, page 557). The use of such polymers in very thin coatings, however, as herein disclosed, has not heretofore been done because of the inability of such coating to provide corrosion resistance. In addition, the ability of such polymers to add lubricatory properties to such coatings and thereby improve the ability of metals coated therewith to be formed has not heretofore been known.

The organic coatings of the present invention are novel and are multi-functional in that they confer improved properties to zinc coated steel that has been coated therewith in several respects. The coatings of this invention lower the coefficient of friction, reduce zinc dust loosening, protect against corrosion, and permit removal with standard cleaners.

Additionally, the fact that these properties are achieved at very low thicknesses, makes the product attractive from an economical viewpoint, not only because so little is used, but also because it is not necessary to use special oils and degreasers. Low thickness is also advantageous in that the coating can dry very quickly. Normally such coatings are applied using galvanizing lines that work at high speed so that standard drying conditions are insufficient to remove all of the solvents if the coatings were applied at a thickness that is normally used.

EXAMPLE 1

The following product, which contained a co-polymer resin and lubricatory additive, was prepared according to the present invention:

| Co-polymer (solution) | 40–50% |
|---|---|
| Ammonia solution | 1.5–2% |
| Wax emulsion | 2–10% |

Deionized water is added such that the resulting product has a dry solids content of from 8 to 18 %. This content is varied depending on the selected metal application process.

EXAMPLE 2

A product was prepared according to Example 1 to which polyvalent cations, which increase corrosion resistance, were added was prepared as follows:

| Co-polymer (solution) | 40–50% |
|---|---|
| Ammonia solution | 1.5–2% |
| Zinc complex (or other cations) | 0.5–1.5% |
| Wax emulsion | 2–10% |
| Deionized water was added as in Example 1. | |

EXAMPLE 3

A product was prepared according to Example 2. Conductive particles, which improve the ability of a metal coated therewith to be welded, were added. This product was prepared as follows:

| Co-polymer (solution) | 40–50% |
|---|---|
| Ammonia solution | 1.5–2% |
| Cation complex | 0.5–1.5% |
| Wax emulsion | 2–10% |
| Colloidal graphite | 1–5% |
| Deionized water was added as in Examples 1 and 2. | |

The above description shows that coatings, which are prepared as herein disclosed are easy to apply and, if applied, provide heretofore unrecognized benefits and uses.

Since modifications will be apparent to those of skill in the art, it is intended that this invention be limited only by the scope of the appended claims.

We claim:

1. A method for temporarily protecting metal members having zinc coated steel surfaces and surfaces of other metal alloys to be formed into non-planar shapes, comprising the steps of:

preparing a mixture comprising 40 to 50% of an aqueous solution consisting essentially of 50–60% by weight of a copolymer of polymerized acrylic monomers having an acidity index of 30 to 60 mg. of KOH and being soluble in water at pH 8 and above, 2 to 10% of an aqueous dispersion of solid lubricatory additives selected from the group consisting of natural waxes, synthetic waxes, and graphite, and deionized water;

moving said metal members on a high speed continuous galvanizing line;

applying said mixture as a wet film to at least one of said surfaces to be protected while moving said metal member on said continuous line by a process selected from the group consisting of roll squeezing, roll coating, electrostatic spraying and ultrasonic deposition to form a coating on said at least one of said surfaces;

drying said coating on said at least one of said surfaces so that said coating has a dry film weight of 0.5 to 5 gr./m$^2$ corresponding to a dry solid content of said wet film of from 8 to 18% by weight, has a lubricating effect reducing the coefficient of friction of the metal surface on which said coating is applied, prevents zinc dust loosening, improves metal forming conditions, does not chemically alter the metal surface, protects against corrosion of the metal surface, is adaptable to application of additional lubricant thereon, is soluble in alkaline solutions and is easily removable from said at least one of said surfaces, and the coated metal is weldable; and forming said coated metal members into desired non-planar shapes.

2. The method as claimed in claim 1, wherein said monomers are selected from the group consisting of ethyl acrylates, butyl acrylates, ethyl-2-hexyl acrylates, methyl acrylates, acrylic acids and methyl acrylic acids.

3. The method as claimed in claim 1, wherein said natural and synthetic waxes are selected from the group consisting of montana wax, carnauba wax, polyethylene wax and polytetrafluoroethylene wax.

4. The method as claimed in claim 1 wherein:
said applying step comprises flooding said at least one of said surfaces with said mixture; and
said roll squeezing comprises roll squeezing said at least one of said flooded surfaces for controlling thickness of said coating.

5. The method as claimed in claim 4 wherein:
said flooding comprises flooding all surfaces of the metal member; and
said roll squeezing comprises roll squeezing all surfaces of said metal member.

6. The method as claimed in claim 1 wherein:
said applying step comprises immersing said at least one of said surfaces in said mixture; and said roll squeezing comprises roll squeezing said at least one of said immersed surfaces for controlling thickness of said coating.

7. The method as claimed in claim 6 wherein:
said immersing comprises immersing all surfaces of the metal member; and
said roll squeezing comprises roll squeezing all surfaces of said metal member.

8. The method as claimed in claim 1 wherein:
said applying step comprises depositing said coating by a roll squeezing roll.

9. The method as claimed in claim 1 wherein:
said applying step comprises depositing said coating on said at least one of said surfaces by roll coating.

10. The method as claimed in claim 9 wherein:
said applying step comprises depositing said coating on all surfaces of said metal member.

11. The method as claimed in claim 1 wherein:
said applying step comprises depositing said coating on said at least one of said surfaces by electrostatic spraying.

12. The method as claimed in claim 11 wherein:
said applying step comprises depositing said coating on all surfaces of said metal member.

13. The method as claimed in claim 1 wherein:
said applying step comprises depositing said coating on said at least one of said surfaces by ultrasonic deposition.

14. The method as claimed in claim 13 wherein:
said applying step comprises depositing said coating on all surfaces of said metal member.

15. The method as claimed in claim 1 and further comprising:
applying separate lubricating material to said coating prior to said forming.

16. The method as claimed in claim 15 wherein:
said separate lubricating material comprises material selected from the group consisting of stamping oil, protective oil, and prelube.

17. The method as claimed in claim 1 wherein:
said dry film weight is in the range of 1 to 2 gr./m$^2$.

18. The method as claimed in claim 17 wherein:
said dry film weight is in the range of 1 to 1.5 gr./m$^2$.

19. The method as claimed in claim 1 wherein:
said drying comprises heating to a temperature above the ambient temperature.

20. The method as claimed in claim 1 and further comprising:
removing said coating after said forming.

21. The method as claimed in claim 20 wherein:
said removing comprises dissolution in an alkaline solution.

22. The method as claimed in claim 15 and further comprising:
removing said coating and said separate lubricating material after said forming.

23. The method as claimed in claim 22 wherein:
said removing comprises dissolution in an alkaline solution.

24. The method as claimed in claim 20 wherein:
said removing step comprises applying said alkaline solution at a temperature between 55° C. and 85° C. for a time period of approximately one to three minutes.

25. The method as claimed in claim 23 wherein:
said removing step comprises applying said alkaline solution at a temperature between 55° C. and 85° C. for a time period of approximately one to three minutes.

26. The method as claimed in claim 1 and further comprising:
adding to said mixture for improving weldability of said coated members a conductive material selected from the group consisting of carbon black, colloidal graphite, magnetite and powered metals.

27. The method as claimed in claim 1 and further comprising:
diluting said mixture with water in an amount dependent on the method of applying the mixture.

* * * * *